US011426029B2

(12) United States Patent
Ghazarian

(10) Patent No.: US 11,426,029 B2
(45) Date of Patent: Aug. 30, 2022

(54) GRILL COOKING DEVICE FOR DIGITIZING COAL WITH PIXELATION CONTROL

(71) Applicant: DABBLE VENTURES, LLC, Sunland, CA (US)

(72) Inventor: Vahan Ghazarian, Sunland, CA (US)

(73) Assignee: DABBLE VENTURES, LLC, Sunland, CA (US)

( * ) Notice: Subject to any disclaimer, the term of this patent is extended or adjusted under 35 U.S.C. 154(b) by 361 days.

(21) Appl. No.: 16/794,417

(22) Filed: Feb. 19, 2020

(65) Prior Publication Data
US 2020/0178730 A1 Jun. 11, 2020

Related U.S. Application Data

(63) Continuation-in-part of application No. 16/241,385, filed on Jan. 7, 2019, and a continuation-in-part of
(Continued)

(51) Int. Cl.
*A47J 37/07* (2006.01)
*F23N 5/02* (2006.01)

(52) U.S. Cl.
CPC ....... *A47J 37/0786* (2013.01); *A47J 37/0745* (2013.01); *F23N 5/022* (2013.01); *A47J 2202/00* (2013.01); *F23N 2239/02* (2020.01)

(58) Field of Classification Search
CPC .............. B01F 11/0094; B01F 11/0097; B01F 15/00181; B01F 15/00207; B01F 31/60;
(Continued)

(56) References Cited

U.S. PATENT DOCUMENTS 1,644,175 A 10/1927 Church
2,246,497 A 6/1941 Beck
(Continued)

FOREIGN PATENT DOCUMENTS

CN 107669151 2/2018

OTHER PUBLICATIONS

Model GL101B Intelligent Temperature Controller marketed by Golander USA (http://www.golanderusa.com) available at https://wikipedia.org/wiki/PID_controller and detailed instructions for the GL101B are available in the User's Guide downloadable at the aforementioned Golander USA website.

*Primary Examiner* — Marc C Howell
(74) *Attorney, Agent, or Firm* — Nolte Lackenbach Siegel; Myron Greenspan

(57) ABSTRACT

The disclosure provides for a device for selectively agitating briquettes on a grill supporting plate. The device includes a variable frequency vibrational device, a power source, and a control circuit that controls the vibrational device at selected frequencies to create various Chladni patterns in the plate and, therefore, heating patterns over the surface of a briquette-supporting pan. The plate supports one or more pieces of charcoal and the device is integrated into the pan. When turned on, the vibrational device vibrates at a selected frequency. This vibration is translated to the briquette-supporting plate and causes different charcoal briquettes to selectively vibrate. The device is capable of selectively activating or pixilating briquettes to generate higher temperatures over different surface areas of the plate when the grill is cooking one or more pieces of food requiring different degrees of grilling or cooking.

19 Claims, 17 Drawing Sheets

Related U.S. Application Data application No. 15/587,340, filed on May 4, 2017, now Pat. No. 10,173,185.

(60) Provisional application No. 62/344,202, filed on Jun. 1, 2016.

(58) Field of Classification Search
CPC .. B01F 31/70; B01F 35/21151; B01F 35/213; A47J 43/0786; A47J 37/0786
USPC .................................. 366/114, 115, 116, 128
See application file for complete search history.

(56) References Cited

U.S. PATENT DOCUMENTS

| | | |
|---|---|---|
| 4,635,571 A | 1/1987 | Olsson et al. |
| 6,868,777 B1 | 3/2005 | Higgins et al. |
| 8,109,217 B2 | 2/2012 | Krebs et al. |
| 9,140,448 B2 | 9/2015 | Freeman |
| 2003/0015188 A1 | 1/2003 | Harbin |
| 2004/0228117 A1 | 11/2004 | Witzel et al. |
| 2007/0085496 A1 | 4/2007 | Philipp et al. |
| 2010/0143489 A1 | 6/2010 | Johansson |
| 2015/0194041 A1 | 7/2015 | Allen |

FIG. 7a  FIG. 7b  FIG. 7c
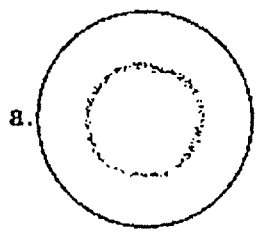 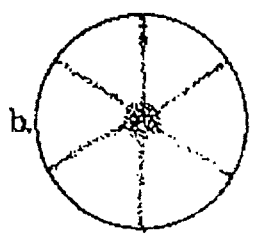 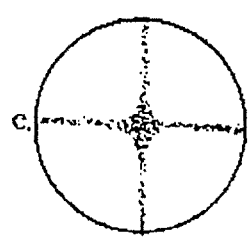
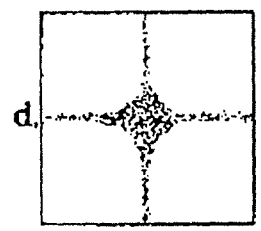 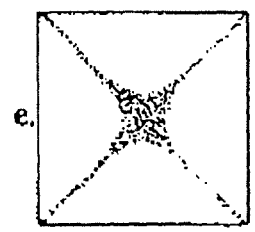 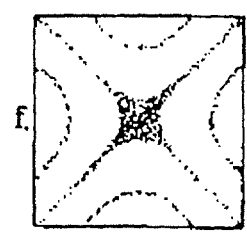
FIG. 7d  FIG. 7e  FIG. 7f

GRILL COOKING DEVICE FOR DIGITIZING COAL WITH PIXELATION CONTROL

CROSS-REFERENCE TO RELATED APPLICATIONS

This application is a Continuation-In-Part (CIP) and claims the priorities of an application Ser. No. 16/241,385 filed on Jan. 7, 2019, that was a Continuation-In-Part (CIP) of application Ser. No. 15/587,340 filed on May 4, 2017, now issued as U.S. Pat. No. 10,173,185, that claimed priority of Provisional Patent Application No. 62/344,202 filed on Jul. 1, 2016, all of which are incorporated as if fully set forth herein.

BACKGROUND

1. Field of the Invention

The invention generally relates to grill cooking devices and, more specifically, to grill cooking device for digitizing coal with pixelation control.

2. Description of Background Art

Barbeque grills are commonly used to cook meat and vegetables. Such grills typically include a grid to support the food heated by a heat source below the grid. Barbeque grills are generally heated by either gas or charcoal.

When charcoal is used it begins to combust, creating a coating of ash on its outer surface. This ash coating insulates the charcoal and reduces the heat dissipation to the food. This decrease in temperature causes the heat source in the barbeque grill to fluctuate, creating an inconsistent and inefficient heat source as the ash flakes off randomly on different briquettes.

Typically, the ash may be manually removed by agitating the charcoal. For example, a user may hit or shake the barbeque grill, stir the charcoal, or blow on the charcoal surface. However, these methods are relatively ineffective, inconvenient, and unsafe, as each can result in dislodging the charcoal, which may cause burns or can cause ash to become airborne, which may result in the inhalation of ash or the depositing of ash on the food being cooked.

U.S. Pat. No. 10,173,185 and application Ser. No. 16/241, 385, both of which are incorporated as if fully set forth herein, describe grill cooking devices that turn on or turn off a vibrating device to remove ash off the surfaces of briquettes typically supported on a flat plate that support the burning briquettes in response to manual activation, reaction to the color of the briquettes, a timer or a temperature sensor. Once a control device receives a signal to increase temperature and the vibrating device is activated to vibrate the plate on which the charcoal briquettes are supported, the briquettes over the entire plate are vibrated in the same manner and at the same or constant frequency. Thus, there is no mechanism to selectively activate certain briquettes more or less than others. However, it may be desirable, in certain instances, to selectively vibrate some briquettes in the grill more than others in order to localize or focus heat over one part of the grill over another. It may be desirable, for example, where the heat applied to certain meats, such as steaks, to be lower in order to prevent same from being overcooked or overdone while other foods on the same grill require more heat, such as baked potatoes or other vegetables.

SUMMARY OF THE INVENTION

Exemplary embodiments described herein include a grill cooking device. Typically, a grill that uses charcoal as a heating source to cook food may become inefficient and/or cook food unevenly. This may occur because charcoal, once ignited, may become coated in ash. This ash may affect the heating dissipation from the charcoal. In an exemplary embodiment, the grill cooking device may be configured to physically agitate the grill or a grill component. Because the charcoal is housed in the grill, the charcoal may in turn be agitated, causing the ash to be shaken from the charcoal. The grill cooking device may be a discrete component or may be integrated into a grill.

In an exemplary embodiment, the grill cooking device may include a motor, a power source; and a control circuit. The control circuit may control the motor. The grill cooking device may be located near or configured to attach to a generally thin flat pan of the grill. The pan of the grill may support one or more pieces of charcoal. The grill cooking device may also be located near or configured to attach to a housing of the grill.

When the grill cooking device is turned on, the motor is caused to vibrate, which causes the pan and the charcoal briquettes on the pan to vibrate. This vibration permits the ash on the briquettes to be dislodged.

The control circuit may further include a receiver and a controller. The receiver may accept commands from a controller. The controller may include, but is not limited to, a phone, a tablet, or a computer. The controller may communicate with the receiver through a wired or wireless connection.

It is an object of the invention to provide the above advantages or benefits but additionally enable a user or a control device to vibrate the plate on which the briquettes are supported at one or more variable frequencies to help nodal lines or vibration modes that selectively vibrate some briquettes to shake off ash on their surface to make them hotter while maintaining certain briquettes in substantially stationary mode to help the briquettes maintain their ash on their surface to thereby render these briquettes cooler.

It is another object of the invention to provide a cooking grill device that provides for accelerating ignition of the charcoal briquettes.

It is still another object of the invention to provide a grill cooking device for digitizing coal that provides temperature cruise control, i.e. maintaining the temperature of the briquettes at a constant uniform temperature over time.

It is yet another object of the invention to provide a grill cooking device as in the previous objects that allows for user controlled "boost" of the temperature emitted by the briquettes to provide maximum temperature.

It is a further object of the invention to provide a grill cooking device that enables vibrational cooking, namely vibration of the food being grilled.

It is still a further object of the invention to provide a grill cooking device of the type under discussion that uses one or more motors or other vibrational elements that enables different vibrational frequencies and modes on different parts of the barbeque pan and the briquettes supported thereon to be heated in different regions.

It is yet another object of the invention to provide a grill cooking device as in the aforementioned objects that includes a proportional-integral derivative (PID) controller to control the vibrational components on the basis of feedback that is generated by sensor inputs.

It is an additional object of the invention to provide a grill cooking device of the type under discussion that includes an app for controlling the cooking parameters including vibrational modes by utilizing a smart phone to enable personalized cooking preferences.

It is still an additional object of the invention to provide a "flush" feature to remove charcoal from the grill after the briquettes have been fully consumed.

It is yet an additional object of the invention to provide a grill cooking device as in the previous objects that also optionally provides a multi layered grate system providing extended grilling experience and self cleaning of the grill.

BRIEF DESCRIPTION OF THE DRAWINGS

The above and other aspects, features and advantages of the present invention will be more apparent from the following description when taken in conjunction with the accompanying drawings, in which:

FIGS. 7a-7f illustrate pixelation vibration patterns for circular and square plates;

DETAILED DESCRIPTION

Figure 1:
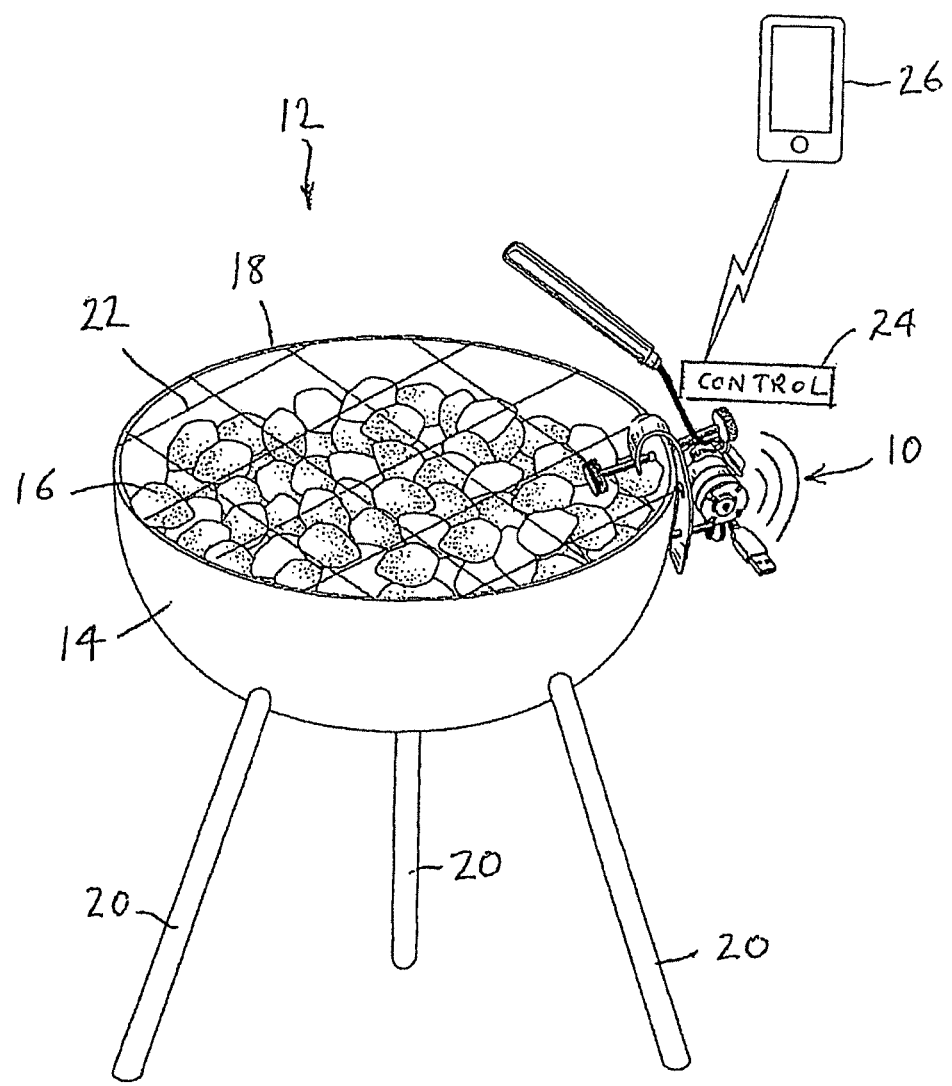
FIG. 1 illustrates a perspective view of an exemplary embodiment of a barbeque grill.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

As used herein, the terms "about," "substantially," or "approximately" for any numerical values, ranges, shapes, distances, relative relationships, etc. indicate a suitable dimensional tolerance that allows the part or collection of components to function for its intended purpose as described herein.

Exemplary embodiments described herein include a grill cooking device. Typically, a grill that uses charcoal as a heating source to cook food may become inefficient and/or cook food unevenly. This may occur because charcoal, once ignited, may become coated in ash. This ash may affect the heating ability of charcoal. In an exemplary embodiment, the grill cooking device is configured to physically agitate the grill. Because the charcoal is supported by the grill, the charcoal may in turn be agitated, causing the ash to be shaken off the charcoal. The grill cooking device may be a discrete component or may be integrated into a grill. In essence, the grill cooking device may digitize the heat flux control of the charcoal through one or more vibrational pulses.

In an exemplary embodiment, the grill cooking device may include a housing. The housing may support or enclose a motor, a power source, and a controller. The grill cooking device is configured to attach to the grill and agitate the charcoal to remove the ash layer.

In an exemplary embodiment, the grill cooking device may include a motor. The motor may vibrate and thus mechanically agitate the grill. The motor may be a rotational motor with an offset weight at one end of the motor. The motor may also or alternatively be a linear vibrator that extends linearly or horizontally in a direction of travel. The motor may also or alternatively be a piezo electric motor. The word "motor" may represent a broad range of mechanical devices capable of vibrational motion. The grill cooking device may be configured to vibrate for a pre-set period of time, to vibrate intermittently, to turn on upon a designated event (such as a temperature threshold or time lapse), or other control configuration.

In an exemplary embodiment, the offset weight may be approximately 100-150 grams in weight.

In an exemplary embodiment, the motor may vibrate at a high frequency.

In an exemplary embodiment, the motor may vibrate at a resonant frequency.

In an exemplary embodiment, the motor may vibrate at a frequency of approximately several hundred hertz.

In an exemplary embodiment, the motor may vibrate for a period of approximately a few seconds, such as 1-30 seconds, 1-10 seconds, 2-10 seconds, 1-5 seconds, 2-3 seconds, and any combination therein and thereof.

In an exemplary embodiment, the grill cooking device may include a connector that allows it to be removably attached to the grill. The connector may include, but is not limited to, a hook mechanism, a screw mechanism, a magnet, a clamp mechanism, or any combination thereof. For example, one or more magnets may be located on the accessory such that the magnets may interact with the grill. A hook may also be located on the accessory, such that a hook may interact with a top portion or lip of the grill in addition to the magnets interacting with an exterior outside surface of the grill. The hook may allow a cover for the grill to be placed on top of the grill.

In an exemplary embodiment, the connector may come into direct contact with the pan of the grill. Because the pan may become hot during operation of the grill, the connector and/or grill accessory may be able to withstand a sufficiently high temperature.

In an exemplary embodiment, the grill accessory may include a controller. The controller may turn the motor on and off. The controller may be mechanical and/or electrical. For example, the controller may be a button, switch, toggle, touch screen, or other user input that permits the user to turn the grill accessory on and off. The controller may include a processor, timer, receiver, or other mechanism of receiving instructions or signals to turn the controller on and off either at the grill accessory and/or received from a user through a remote device. In an exemplary embodiment, controller includes a timer, temperature sensor, processor, and combinations thereof for determining based on data received from the timer and/or temperature sensor whether to turn the grill accessory on or off.

In an exemplary embodiment, the grill accessory may include a light source. The light source may include, but is not limited to, a light emitting diode (LED) or a light bulb.

In an exemplary embodiment, the grill accessory may include a laser. The laser may be an infrared laser and may be able to detect a temperature of the food being cooked. The laser may also or in addition thereto detect the spectroscopic changes of the food being cooked.

In an exemplary embodiment, the grill accessory may include a temperature sensor. The temperature sensor may detect a temperature of the charcoal and/or the food being cooked. The temperature sensor may also relay information to the controller and/or an output device on the accessory.

In an exemplary embodiment, the grill accessory may include a receiver. The receiver may accept commands from a controller. The controller may include, but is not limited to, a phone, a tablet, or a computer. The controller may communicate with the receiver through a wired or wireless connection. The wireless connection may include, but is not limited to, a local area network (LAN), Bluetooth, WiFi, or combinations thereof.

In an exemplary embodiment, the controller may include an application. This application may be executed on a remote electronic device and receive input from a user and/or provide information to the user. The application may communicate over the wired or wireless connection to provide commands to the receiver. This application may provide information to the user from the grill accessory. Although embodiments of the invention may be described and illustrated herein in terms of a grill accessory for a charcoal grill, it should be understood that embodiments of this invention are not so limited, but are additionally applicable to other grills. Exemplary features disclosed herein may be used in any combination, such that features may be removed, duplicated, integrated, separated, or otherwise recombined and remain within the scope of the instant disclosure.

FIG. 1 illustrates a perspective view of a barbeque grill. The barbeque grill may be any conventional charcoal grill. As shown in FIG. 1, a barbeque grill may include a pan 14, one or more pieces of charcoal 16, a grate 22, a grill accessory 10, and one or more legs 20. The pan 14 may be approximately semi-spherical and hollow and may be supported by the one or more legs 20. The pan 14 may include any other grill configuration, such as having a circular, ovoid, rectangular, square, or other cross section. The grate 22 may rest on a top portion of the pan 14, such as an upper ledge or internal lip or protrusions within the upper region or outer edge of the pan. The one or more pieces of charcoal 16 may be placed inside of the pan such that the grate 22 may be above the charcoal 16. The charcoal 16 may rest directly on the pan or on a second grate (not shown). The second grate may be supported by the internal surface of the pan. The internal surface of the pan may include a ledge, lip, indentation(s), or be shaped to support the first and second grate at a specific location along the internal surface of the pan to define a static relative distance between the first grate, second grate, and/or the pan.

In order to cook food using the barbeque grill, the pieces of charcoal 16 may be ignited. Food may then be placed on top of the grate 22. The ignited charcoal 16 may provide a heat source to cook the food. However, once ignited, charcoal 16 may become coated in an ash, which in turn reduces the heat provided by the charcoal 16 to the food. This may cause the food to cook unevenly and/or inefficiently. The accessory may mechanically agitate the pan, which may in turn agitate the charcoal 16, causing the ash to fall off of the charcoal 16. The accessory may mechanically agitate the charcoal directly.

As shown in FIG. 1, the accessory 10 may include a control circuit 24 and a controller 26. The controller 26 may include an electronic device such as, but not limited to, a phone, a computer, or a tablet. The controller 26 may communicate with the control circuit 24. The controller 26 may communicate with the control circuit 24 through a wired connection or wirelessly. Exemplary wireless connections may include, but not limited to, Bluetooth, Wi-Fi, or radio frequency (RF). Exemplary wired connections may include USB, micro-USB or other port 58. The controller 26 may therefore be separate and remote from the grill, the grill accessory, and/or the control circuit 24.

The controller 26 may be configured to display information to a user and/or receive information from a user. The control circuit 24 may include a receiver and/or transmitter. The controller 26 may communicate with the receiver/transmitter. In an exemplary embodiment, the controller includes a processor and memory. The controller may include an application stored in memory and/or retrieved from a remote memory source, such as through a browser, and when executed by the processor is configured to display a user interface to the user. The user interface may be configured to receive and display information to the user. Exemplary information displayed to the user may include temperature from the one or more temperature sensors of the grill accessory described herein, an elapse time, cooking tips (such as preferred cooking temperatures and/or times), or other information related to or retrieved directly or indirectly from the grill accessory, the grill, or the food. The user interface may be configured to provide one or more user controls for controlling or communicating with the grill accessory. For example, the user interface may include controls for turning on and/or off exemplary features of the grill accessory, such as, for example, the light, the motor, the one or more temperature sensors, the timer, etc. The user interface may include controls for setting preferences or controls for the grill accessory, such as, for example, setting a timer, a threshold temperature, setting a duration, selecting a mode, or other preferences, features, controls, inputs described herein.

In an exemplary embodiment, the accessory may be coupled to an upper portion of the pan. As shown in FIG. 1, a bracket of the accessory may hook onto a lip 18 of the pan, and may be located proximate the grate 22.

The bracket 34 may include an upper portion that is substantially U-shaped 34*a* and a lower portion that is elongated 34*b*. The elongated lower portion may approximate a linear planar or curved planar surface. The bracket may include other hook shapes, such as more linear/squared off to approximate a portion of a rectangular cross section. The lower portion 34*b* may be shaped to approximate an exterior surface of the grill pan. For example, for the semi-spherical grill illustrated in FIG. 1, the lower portion may be approximately liner in a first direction (generally horizontal in a use position) and curved in a second dimension perpendicular to the first dimension. The curvature may approximate the curvature of the spherical exterior surface of the grill. The lower portion may approximate an average surface shape across different grill models, shapes, sizes, etc.

The bracket 34 may also allow the accessory to be coupled to the grill. The bracket may therefore include one or more connectors. In an exemplary embodiment, the bracket may include a hook, and the hook portion may include a removable attachment portion. As shown, the hook portion comprises the u-shaped portion 34*a*. The U-shaped portion 34*a* may hook onto an upper portion of the pan. The U-shaped portion 34*a* may include outwardly opposing portions 34*a*' and 34*a*" that may be connected by an approximately arcuate connecting portion 34*c*. The opposing portions 34*a*' and 34*a*" may be spaced sufficiently apart such that the U-shaped portion 34*a* may receive a lip of the pan. The opposing portions 34*a*' and 34*a*" may also each include a threaded hole 38. A threaded screw or bolt 40 may be threadedly meshed through each of the threaded holes 38. Each threaded screw or bolt 40 may include a knob 42 at a terminal end of the screw or bolt 40. The knob 42 may allow a free end 44 of each the screw or bolt 40 to move, which may in turn allow a space 60 in between the two screws or bolts 40 to vary in size. In an exemplary embodiment, one of the screw/hole combinations may be replaced with an inwardly projecting protrusions, such that it approximates the presence of one of the screw extensions, but is permanently attached thereto. In this case, one side of the attachment hook directly rests against the grill and a single screw is used to secure the accessory to the grill by reduced a space between a side of the hook portion and a terminal end of a screw portion, thereby capturing the grill in between. The screws and/or projections may be linearly aligned such as along axis AT. The bracket 34 may comprise other removable attachment portion in addition and/or alternatively to the exemplary configuration of FIG. 1. For example, the bracket may include a hook, clamp, projection/protrusions, detent, deformable surface/structure, spring, screw, magnet, buckle, tie, ratchet, clip, button, snap, other securing mechanism, or combinations thereof.

The lower portion 34*b* may also include a portion to transmit vibration from the motor to the grill. As shown, the transmission portion may include a projection from a surface of the bracket toward the surface of the grill. As shown, the bracket includes a threaded hole 48, and a vibration screw or bolt 46 threadedly meshed through the threaded hole 48. The vibration screw may include a knob 42 on a terminal end and a tip 50 on another terminal end, opposite the knob 42. The tip 50 may be approximately on the same side of the bracket as the space 60. The tip may include a heat resistant surface and/or soft impact surface to interface with the exterior surface of the grill. In an exemplary embodiment, the tip may be magnetic.

Figure 2:
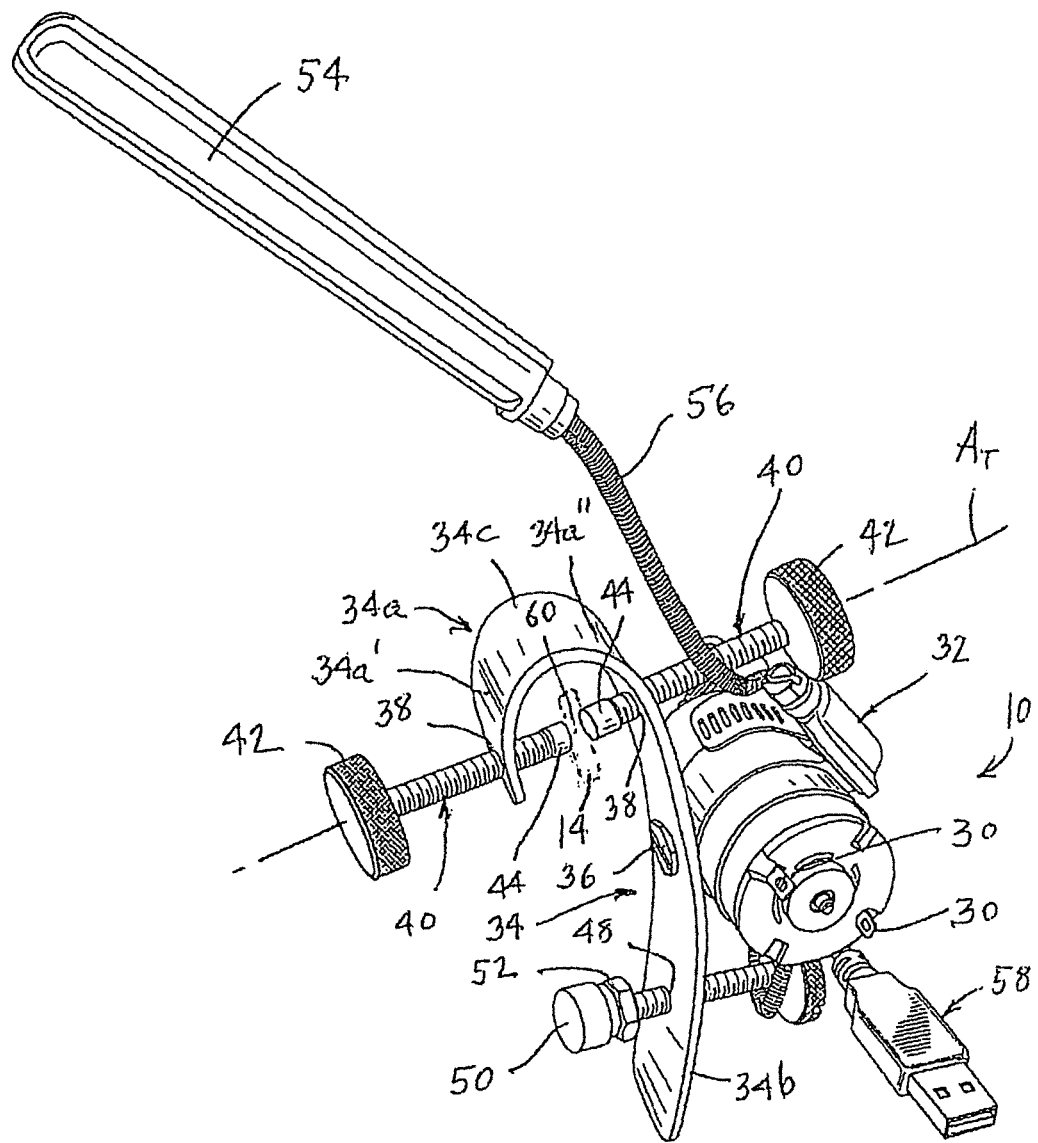
FIG. 2 illustrates a perspective view of an exemplary embodiment of a grill cooking device.

In an exemplary embodiment, the contact points between the grill accessory and the grill is minimized to reduce heat transfer to the accessory. For example, the accessory is configured to contact the grill at a hook portion, and/or at one, two, three, or four discrete contact points. As shown in FIG. 2, the grill accessory contacts the grill surface at three points outside of the top support of the hook portion. These contact points include the tip of screws 42, 46. The contact points may be integrated projections on the bracket or grill assembly, or may be movable/removable with respect to the bracket, such as by screws. The top surfaces of the hook may also include one or more projections to minimize contact and create discrete contact points along the hook surface.

In an exemplary embodiment the bracket 34 supports a vibration mechanism. The vibration mechanism may have a motor. The bracket 34 may be physically coupled to the motor 28. As shown, an adjustable strap 32 attaches the motor to the bracket. Other or additional attachment mechanisms may be used, such as any described herein, including, without limitation, ratchet, belt, tie, button, clasp, snap, hook and loop, deformable arms, screw, clamp, elastic band, other securing mechanism, or combinations thereof. The motor may create the vibration or shaking to the grill. In an exemplary embodiment, the vibration mechanism includes a motor and off axis weight.

In an exemplary embodiment, the grill accessory may include additional features associated with the vibration function, grill, food, or other desired attribute. For example, the grill accessory may include a switch, temperature sensor, timer, display, light source, wired or wireless communication port (e.g. USB, mini-USB, Wi-Fi, Bluetooth, Radio Frequency, etc.), power supply, power supply connector, controller, transmitter, receiver, speaker, projector, spectroscope, laser measure, fan, liquid dispenser, camera, audio source, temperature sensor, humidity sensor, other sensors, and any combination thereof.

FIG. 2 illustrates a perspective view of an exemplary grill accessory. As shown in FIG. 2, the grill accessory may include a motor 28, a bracket 34, a power source, a light source 54, and a communication port 58. The light source 54 may be connected to the grill accessory by a support arm, such as a hose 56. The hose 56 may be flexible, which may allow the position of the light source 54 to be moved such that a light from the light source 54 may be used to illuminate different areas. The hose 56 may maintain its shape/position, but may be deformable when an external force is applied thereto. Any support may be used for the light source 54, such as pivoted, jointed, telescoping, and/or movable or rigid arm segments.

Figure 4:
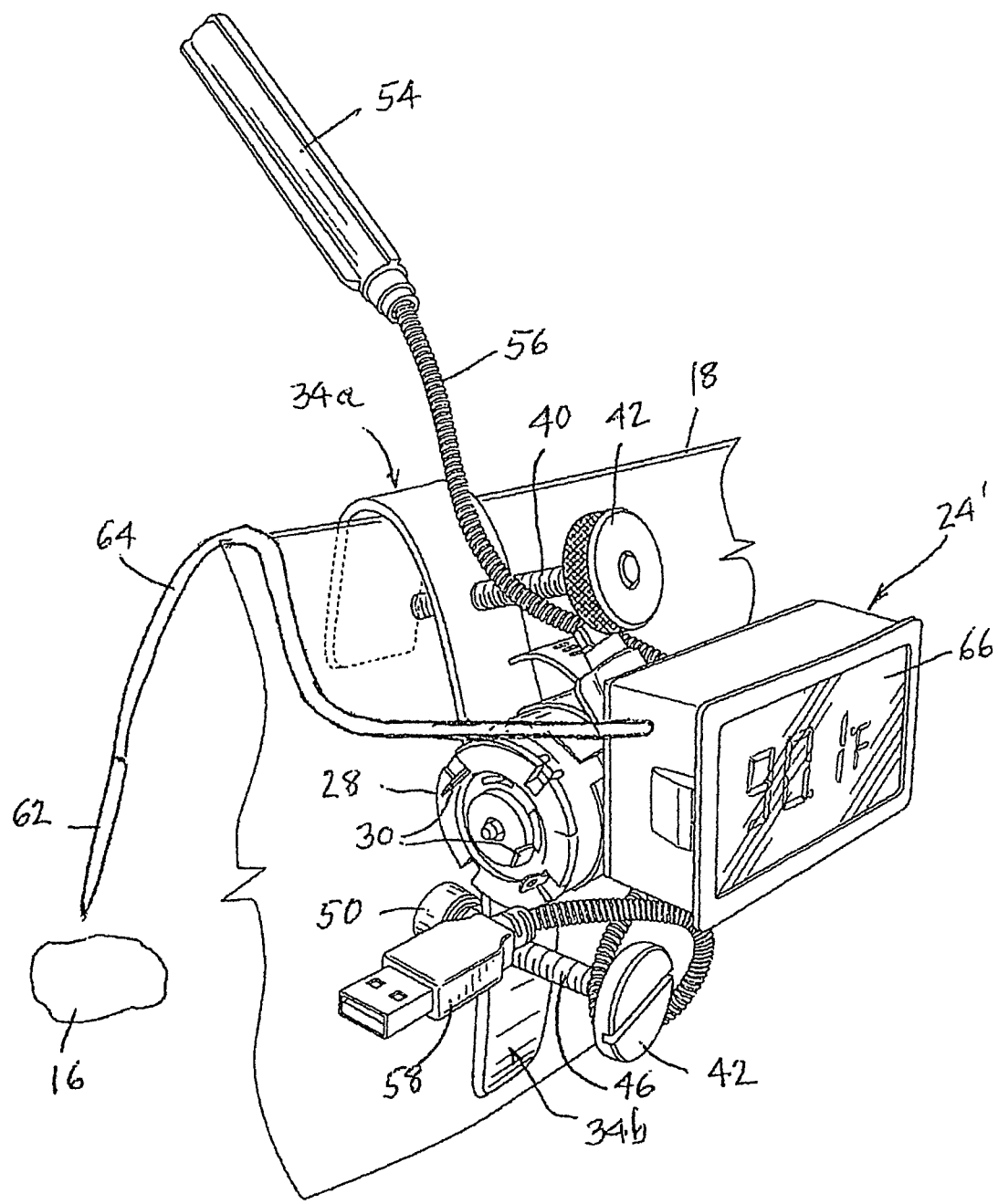
FIG. 4 illustrates an exemplary embodiment of the grill cooking device.

FIG. 4 illustrates a perspective view of an exemplary grill accessory. The grill accessory may include a temperature sensor and/or a temperature display. As shown in FIG. 4, the grill accessory may include a control device 24' and a thermocouple 62. The thermocouple 62 may be connected to the control device 24' by a cable 64 that extends over the lip 18 of the pan. The thermocouple 62 may detect a temperature of the charcoal 16. The control device 24' may also include an output 66. The output 66 may display a temperature of the charcoal 16. In an exemplary embodiment, the control device 24' may control the vibration mechanism to turn on and/or off based on the temperature received from the thermocouple. The thermocouple may be positioned in a space adjacent the coal to detect a radiant heat from the coal. In an exemplary embodiment, the thermocouple may be configured to position the thermocouple in a static position relative the coals, the grill, and/or the grill accessory, or a component thereof. In an exemplary embodiment, the thermocouple may be configured to dynamically positioned relative the coals, the grill, and/or the grill accessory, or a component thereof. In an exemplary embodiment, the thermocouple may be positioned near the food to detect a grilling temperature felt at a cooking space. In an exemplary embodiment, a plurality of temperature sensors may be used to detect a temperature at different locations in the grilling space. Therefore, a temperature distribution may be monitored.

In an exemplary embodiment, the control device 24' is configured to turn on the motor if the temperature is detected below a first threshold value. The control device 24' may be configured to keep the motor on until the temperature exceeds a second threshold value. The first threshold value may be the same as the second threshold value. The first threshold value may be lower than the second threshold value. In an exemplary embodiment, the control device 24' is configured to turn off after a duration of time. In an exemplary embodiment, the control device 24' may be configured to turn on the motor if a temperature difference detected between any two temperature sources exceeds a first difference threshold. The control device 24' may be configured to turn off the motor if the temperature different is below a second difference threshold or for a duration of time. The first difference threshold may be the same as the second difference threshold. The first difference threshold may be greater than a second difference threshold.

In an exemplary embodiment, the thermocouple may include a needle type exterior for piecing a food to be cooked. In this case, the thermocouple may be used to detect a cooking temperature of the food. The temperature senor may communicate with a display and display an internal temperature of a cooked food.

Figure 3:
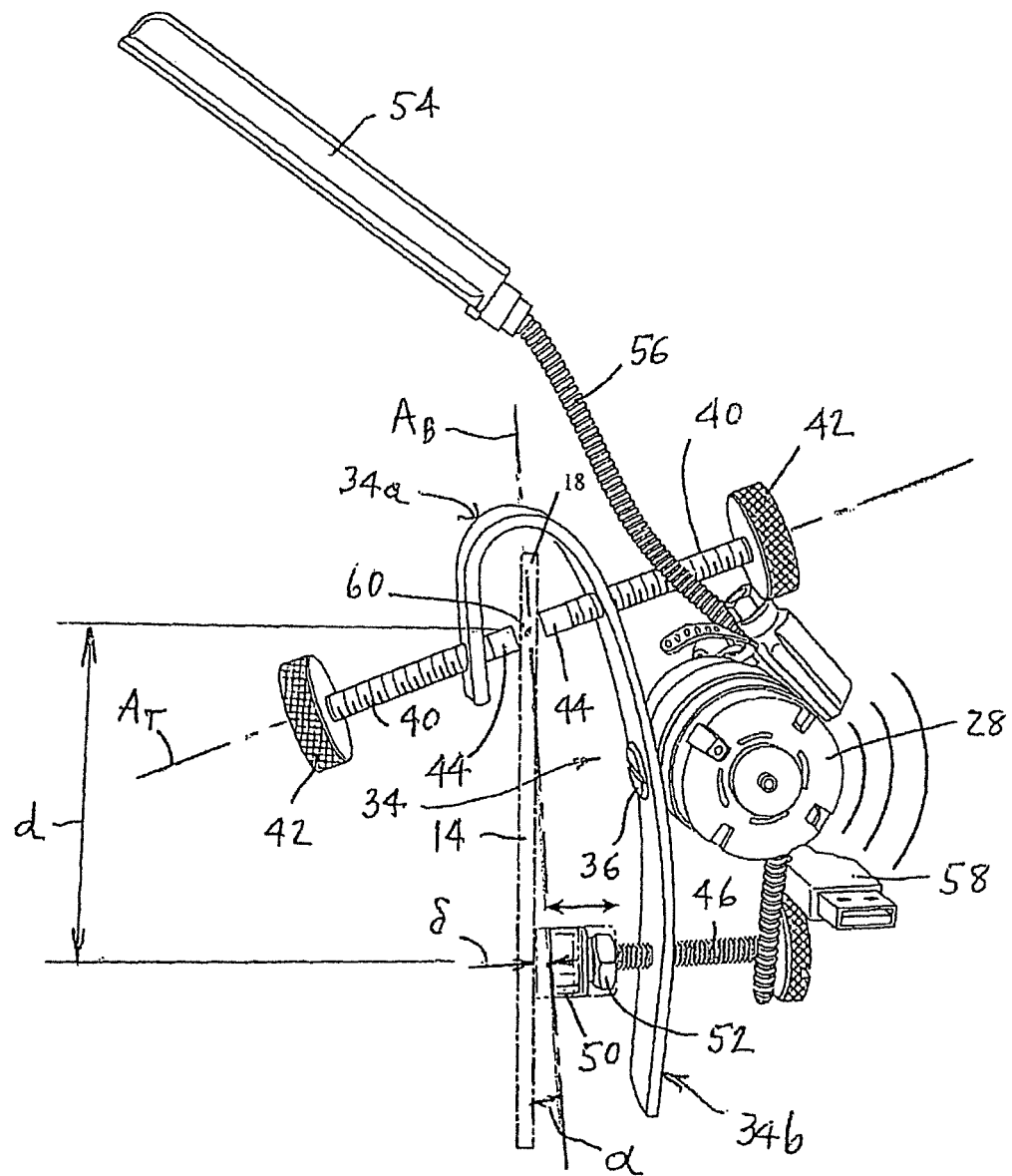
FIG. 3 illustrates an exemplary embodiment of a grill cooking device as engaged with a portion of the grill.

FIG. 3 illustrates the grill accessory as engaged with the grill. As shown in FIG. 3, the space 60 between the threaded screws or bolts 40 may receive a lip 18 of the pan. Once the accessory is placed on the pan, the screws or bolts 40 may be rotated in order to make the space 60 smaller, such that the free end 44 of the screws or bolts 40 secure the accessory onto the lip 18 of the pan. It may be understood that the bracket 34 may have a degree of freedom of movement relative to the pan since it may only be secured at the U-shaped portion 34a. The screws or bolts 40 may be adjusted such that the tip of the vibration screw 50 and the pan 14 may have a gap 6 between them and the tip of the vibration screw 50 may be at an angle a to the pan 14. The axis of the attachment screws 40 may also be angled with respect to the pan surface such that the screws project at a non-zero angle from normal of the pan surface at the point of contact.

The motor 28 may vibrate when turned on, which may in turn cause the bracket 34 to vibrate. This, in turn, may cause the tip 50 to vibrate, and as such, repeatedly come into contact with the pan 14. The tip 50 may transmit this vibration to the pan 14, as the tip 50 may cause the pan 50 and the pieces of charcoal held within the pan, to move when the tip contacts the pan 14. This movement may cause ash that has developed on the surface of the pieces of charcoal to become dislodged.

Figure 5:
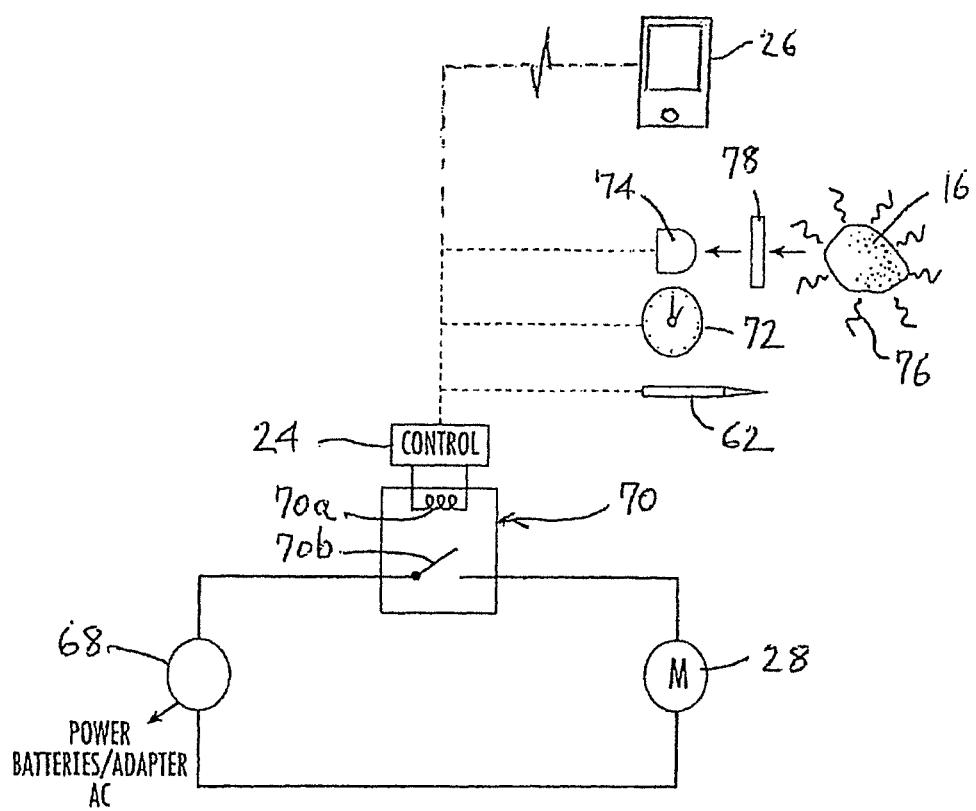
FIG. 5 illustrates a circuit schematic of an exemplary embodiment of a grill cooking device and various modes of controlling the grill cooking device.

FIG. 5 illustrates a circuit schematic of the grill accessory and various modes of controlling the grill accessory.

The motor 28 may be connected to a power source, as illustrated in FIG. 5. The power source may include, but is not limited to, a USB connection 58, one or more batteries, AC power cord, DC power, or any combination thereof. The motor 28 may be controlled by the control circuit 24 as described herein.

As shown in FIG. 5, the motor 28 may be connected to a power source 68. The power source 68 may vary depending on a power requirement of the motor. The power source 68 and the motor 28 may be connected by an electro-mechanical (EM) component 70. The EM component 70 may further include a coil 70a and a switch 70b. The switch 70b may be open until the coil 70a is energized, thus no power may be applied to the motor 28 unless the coil 70a is energized and the motor 28 may not vibrate until the coil 70a is energized. As shown in FIG. 5, the grill accessory may be turned on, and the coil 70a energized, manually or automatically. The grill accessory may be turned on by the controller 26, as described herein, by energizing the coil and closing the switch. Other control mechanisms, and switch configurations for turning the motor on and off or otherwise controlling features of the grill accessory described herein are within the scope of the present description.

The grill accessory may be turned on by a sensor as described herein. A sensor, such as an optical sensor 74, may receive optical radiation from the charcoal 16. The optical sensor 74 may detect ash 78 on the pieces of charcoal 16. In the event the optical sensor 74 detects ash, the optical sensor 74 may send a signal to the control circuit 24, which may in turn cause the coil 70a to become energized, thus causing the grill accessory to turn on. The optical sensor may be used to detect the presence of ash visually, such as by monitoring a color change or detecting variations in a detected image. The optical sensor be used to detect a temperature of the charcoal, such as with a thermos-optical sensor.

The grill accessory may be turned off based on a timer 72. The timer 72 may be set such that the control circuit 24 turns off the motor 28 after a preset time has elapsed from when the motor was turned on. The timer 72 may also be set to send a signal to the control circuit 24 to turn off the motor 28 after the motor 28 remains on for a second preset amount of time. In an exemplary embodiment, the timer 72 may be programmed such that the motor 28 turns off after approximately a few seconds, such as 1-30 seconds, 1-10 seconds, 2-10 seconds, 1-5 seconds, 2-3 seconds, and any combination therein and thereof, of vibrating. The preset time may be programmed and static to the grill accessory, may be programmable such as through a communication interface or the control circuit, or may be automatically dynamically determined based on other programmed or sensed conditions (etc. it may shake for a longer time if a detected humidity is higher). In an exemplary embodiment, the grill accessory may be turned on by the time, such that the grill accessory is configured to vibrate at specified intervals during a grilling time, with or without the use of the temperature sensor control.

The grill accessory may be turned on by a thermocouple 62. The thermocouple 62 may detect a temperature of the pieces of charcoal and notify the control circuit 24 of the temperature. In the event that the temperature of the charcoal decreases beyond a preset temperature, the control circuit 24 may turn on the motor 28. Once the temperature of the pieces of charcoal reaches and/or exceeds the preset temperature, the motor 28 may be turned off by the control circuit 24.

As seen in FIG. 5, any combinations of control features may be used independently, simultaneously, selectably, or in other combinations. The control circuit may receive data from the one or more information sources, such as a timer, temperature sensor, optical sensor, thermocouple, etc. and control a switch to start or stop the vibration mechanism 28 of the grill accessory.

Figure 6:
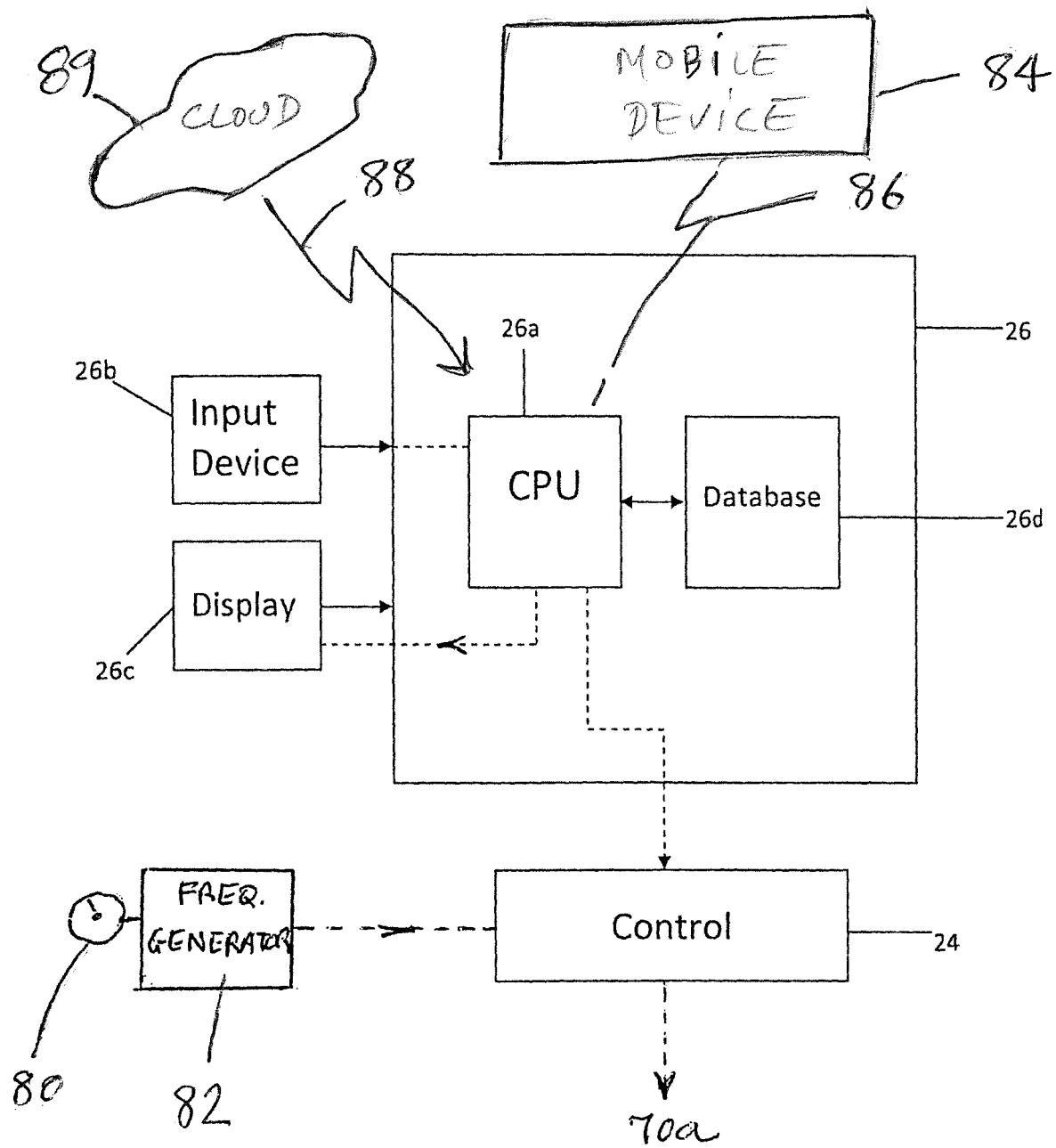
FIG. 6 illustrates a modified controller of the one shown in FIG. 5 to allow the controller to be programmed to customize and regulate the selective grilling of various foods and the degree to which they are grilled by automatically creating nodal lines of different vibration modes or, optionally, to provide a manually controlled frequency generator to control and select desired frequencies to provide a desired pixilation of charcoal briquettes over the surface area of the cooking grill.

An important feature of the instant invention is the ability to vibrate the pan, grate or plate on which the charcoals are placed at different frequencies. FIG. 6 illustrates a modified controller in which the CPU 26a can be programmed to apply various or desired frequencies to the briquettes supporting plate, as a function of input data at 26b in conjunction with a database 26d. Once a user determines the food(s) to be grilled the database can send the data to instruct the CPU 26a to select the appropriate frequency to regulate the heating patterns of the briquettes by selectively vibrating the briquettes, this being termed "pixilation" for purposes of the present invention. By enabling pixilation selective briquettes can be regulated to shed more or less surface ash and, therefore, emit more or less heat above the briquettes to foods being grilled.

The control circuit 24 can also be manually controlled independently of the controller 26 by means of a user input device 80 to adjust any frequency generator 82 that, in turn; controls the control circuit 24.

Figures 8A, 8B, 8C:
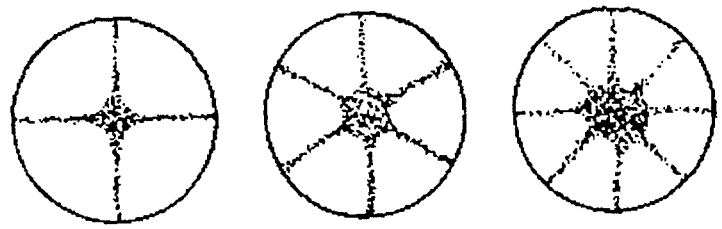
FIGS. 8a-8c show additional vibration patterns for circular plates.
Figures 9A, 9B, 9C, 9D:
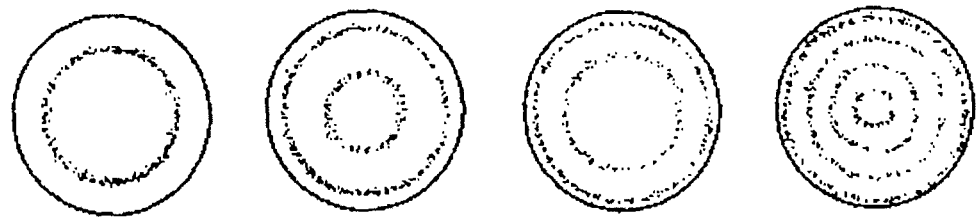
FIGS. 9a-9d illustrate additional vibration patterns in circular plates attainable with the present invention.
Figure 10:
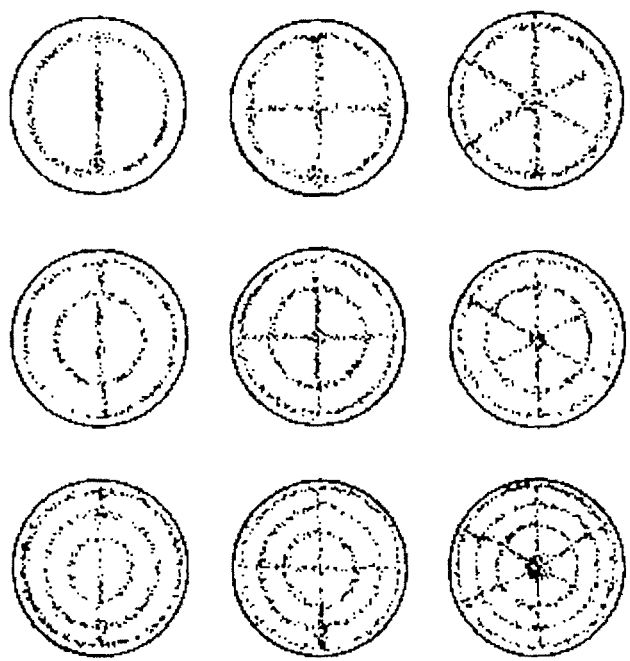
FIG. 10 shows 9 additional variations of circumferential and radial patterns achievable with the present invention by controlling the frequencies applied to the briquette-supporting circular plates.
Figure 11A:
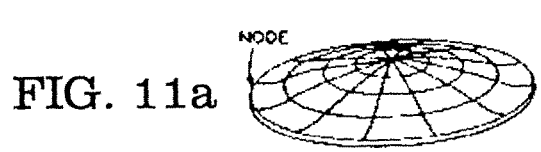
FIG. 11a-11f illustrates the modes of vibrations of a clamped circular plate showing typical locations of patterns of nodes.
Figure 11B:
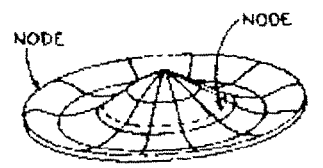
Figure 11C:
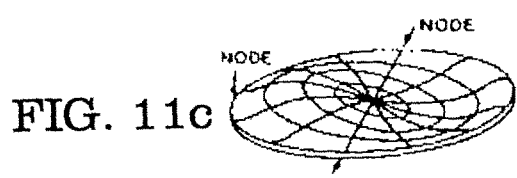
Figure 11D:
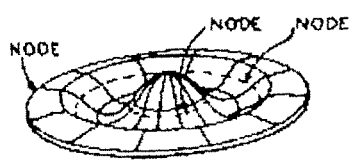
Figure 11E:
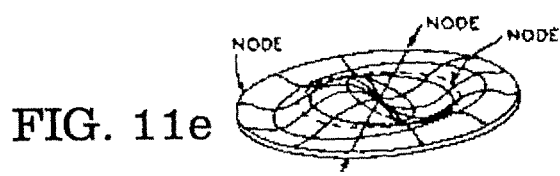
Figure 11F:
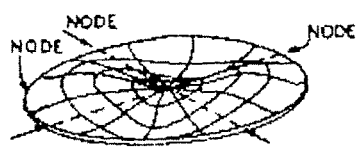

The surface of a plate, diaphragm or membrane when vibrated creates regions of maximum and minimum displacement. This can be made visible by applying a thin coating of fine granular particles on a surface of a plate. Different patterns emerge in the coated particles depending on the geometry and property of the plate and the driving frequency. This phenomena was observed by Ernst Chladni who was one of the early observers of the phenomenon generally known as cymatics. He noted that powder moves in response to vibrations and progressively accumulates in points of the surface corresponding to the vibrations. The points form a pattern of lines known as "nodal lines of vibration modes". The normal nodes of vibration and the pattern of nodal lines associated with each of these are determined for a surface with homogeneous mechanical properties on the basis of the geometric shape of the surface of the plate, its thickness and properties as well as the way the surface is constrained. Thus, for a mode of vibration, some surface areas experience peak displacements while other surface areas experience little or no movements are called nodes. FIGS. 7a-7f illustrate different Chladni vibration patterns for square and circular plates. FIGS. 8a-8c, 9a-9d and FIG. 10 show additional Chladni patterns achievable by controlling the frequency applied to the plates. In the Chladni patterns the areas or lines that are darker depict nodes that experience little or no vibrations, where particles accumulate, while the light areas are the ones that experience more significant vibrations. Therefore, for example, FIG. 8a represents a circular briquette support plate vibrated in a mode to create four quadrants of maximum movements and, therefore, heat release while the least amount of movement and heat would be generated in the center. The number of potential patterns achievable is essentially unlimited. The CPU 26a and database 26d have the ability to store and generate most desired or useful patters for use with a BBQ pan.

FIGS. 11a-11f illustrate how the nodes are generated, providing additional insight as to where the briquettes will be releasing greater heat and those areas where the briquettes will be releasing less heat.

It will be clear that the support plate can be round, square, rectangular or any other shape. Vibrating the plate at variable and selected frequencies provide the user or grill control additional parameters to work with to provide more localized or focused control of the heating patterns over the surface area of a grill. It should also be pointed out that additional and varied patterns may be obtained by selectively clamping one or more sides of a support plate since vibration patterns are also a function of how the plate is supported and at how many points and the extent to which it is clamped or fixed.

The required frequency or frequencies required to obtain any desired pattern for any specific plate or grate configuration is well known to those skilled in the art of Chladni patterns generation.

Figure 12:
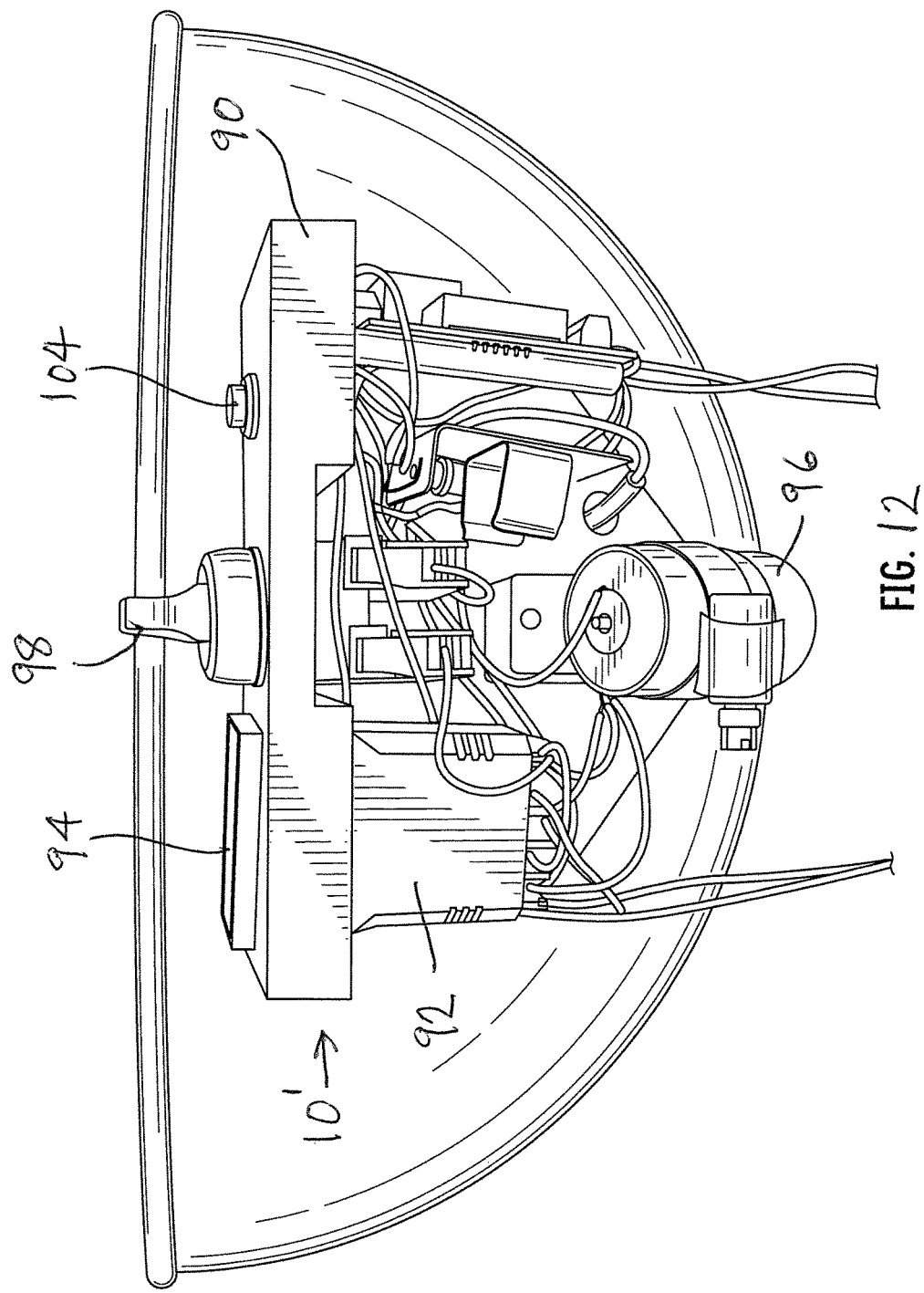
FIG. 12 illustrates a prototype of another embodiment of the invention.
Figure 13:
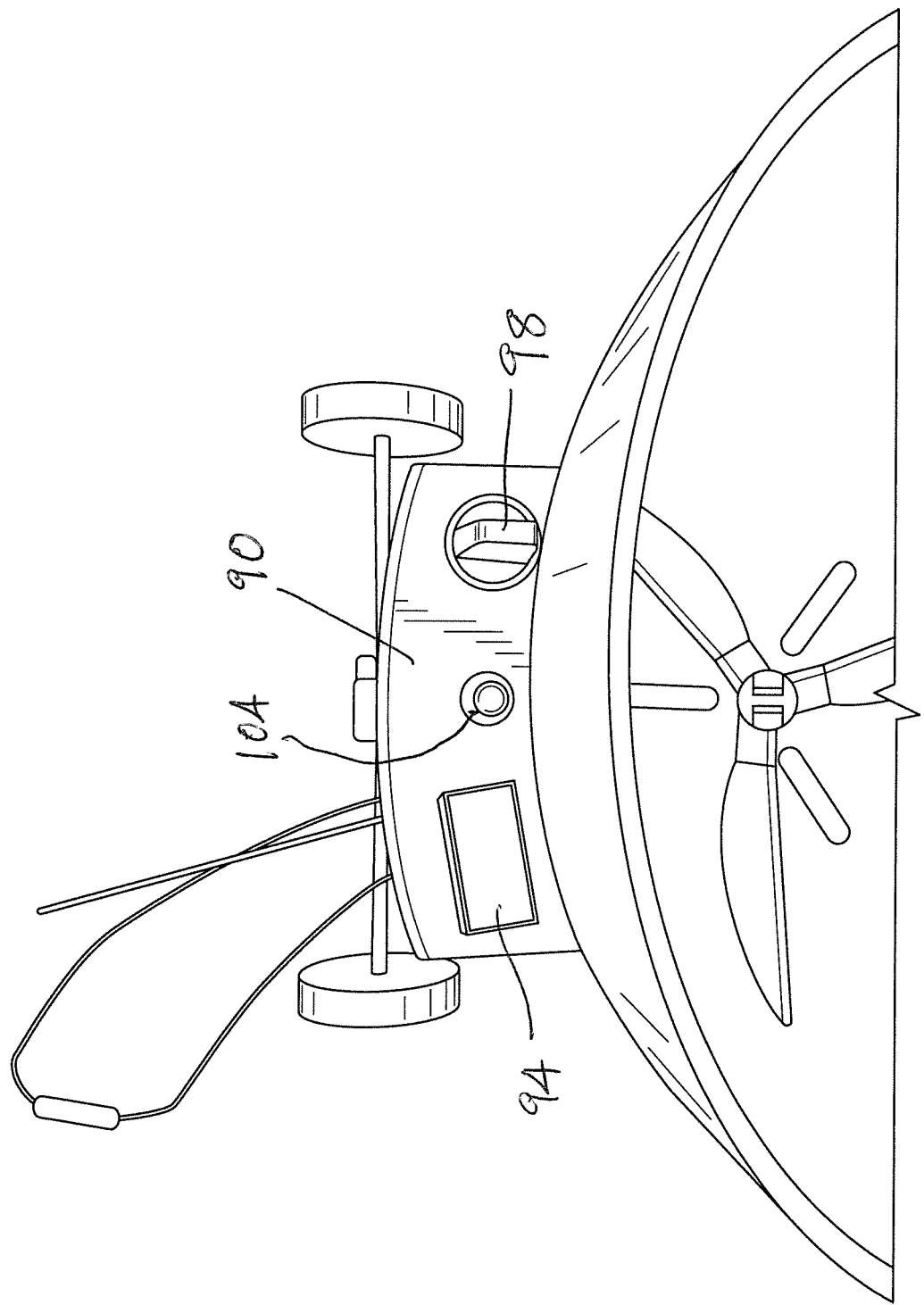
FIG. 13 is a top perspective view of the grill shown in FIG. 12, illustrating the top of the user-control panel.

Referring to FIGS. 12 and 13, a prototype of a further embodiment 10' of the invention is illustrated.

Figure 14:
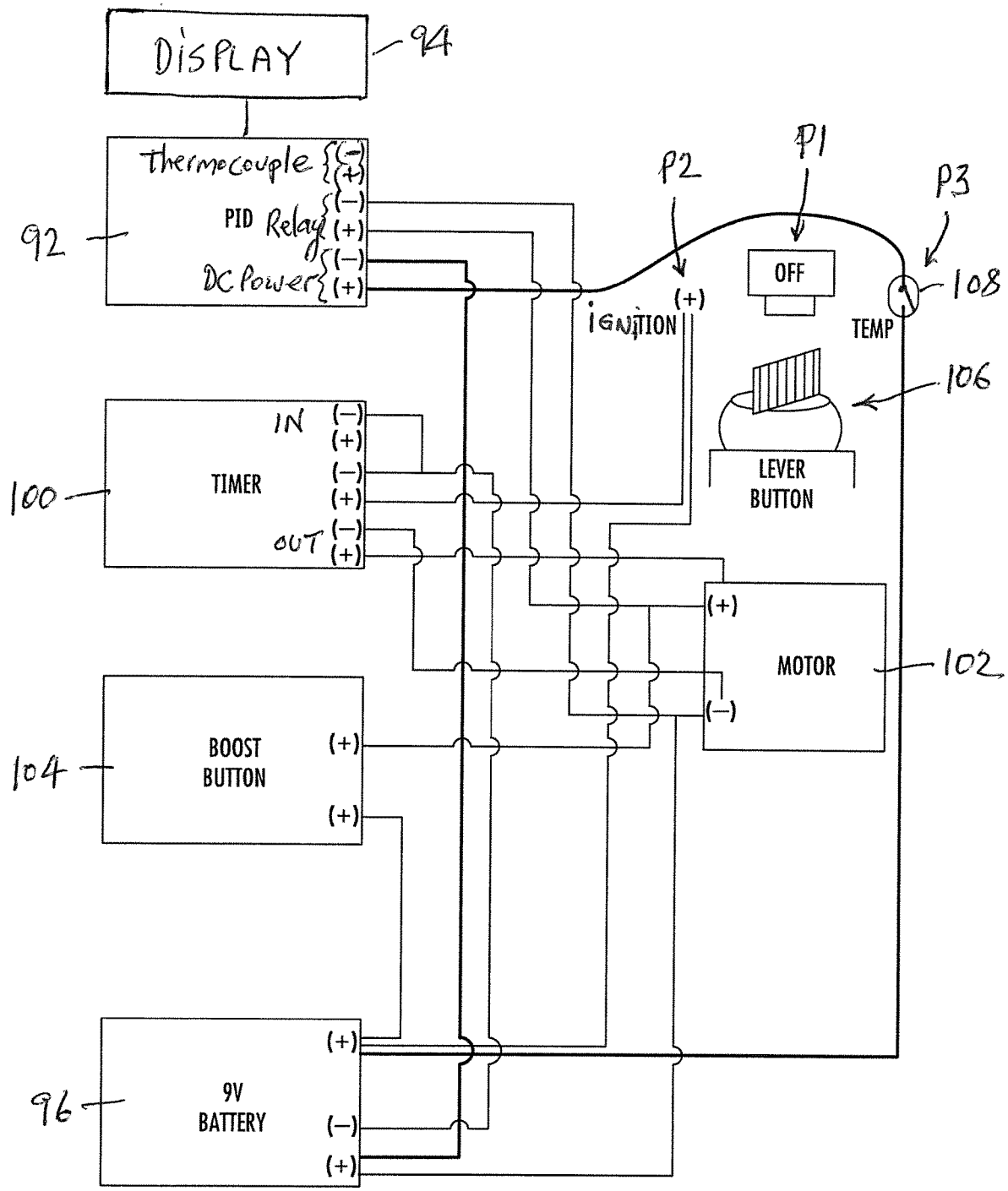
FIG. 14 is a schematic diagram of the circuitry used in the prototype shown in FIGS. 12 and 13.

The modified prototype 10' includes a support panel 90 and a PID controller 92 supported by the support panel. The PID controller 92 has a display 94 accessible through the support panel 90 as shown. A DC battery 96 powers the PID controller 92. A multi-position switch or lever button 98 selects the connections between the PID controller 92, a timer 100 and motor 102 as shown in FIG. 14. A "boost button" 104 bypasses the other control elements and applies full voltage to the motor 40 to apply maximum vibrations to the pan.

Referring to FIG. 14 a multi-position switch 106 can be moved to at least three positions P1, P2 and P3 to select a desired function. In position P1 the unit is in the "off" position in which the battery 34 is disconnected from the other components. In position P2 the contacts at P2 are closed to apply power to the timer 38. In this mode, the motor 40 can be turned on and off in accordance with selected timer intervals. In position P3 power is applied to the PID 92 and the operation of the motor 102 is controlled by the thermocouple 108 in combination with or without the timer 100.

The invention preferably also includes the feature of a "boost" button 104 that causes the pan, plate or grate to vibrate the charcoal at maximum levels and suitable frequencies to shed all or substantially most of the ash on all of the charcoal briquettes and, therefore, quickly raise the temperature to a maximum temperature.

The invention also contemplates the use of a mobile device app programmed to provide many different cooking programs for local or remote ignition. The programs can be used for cooking including vibrational cooking to vibrate meat or other foods at a desired frequency or frequencies less or more aggressively, on a continuous basis or in selected intervals such as every 15-20 seconds, that spread the juices or fluid components within the food being cooked or grilled evenly so that meat, for example, doesn't dry out. This is referred to in this application as "vibrational cooking". Many apps are contemplated to customize the vibrations so that people can enjoy cooking and customizing their barbeque to their individualized likes and preferences.

Referring to FIG. 6 a mobile device 84 is shown that can communicate with the CPU 26a by any wireless method 86, such as a WI-FI or Bluetooth, to transmit real-time information to or from the mobile device. The CPU 26a can also be used to send real-time information 88 to or from the Cloud 89. Such real-time information can tell a user the stage or state of cooking/grilling, how much time remains to complete the cooking/grilling, the temperature in the grill, etc. This information, including any user implemented programming or requirements, can be stored on the mobile device 84 app, the database 26d and/or the Cloud 89 for future cooking/grilling sessions.

With the concept of digitizing coal with pixilization control, each briquette becomes a pixel, as aforementioned, and it is controlled by the device. In this connection, one or more frequencies can be used to excite the pan supporting the briquette. The applied frequencies can be in the form of continuous wave frequencies or pulses that are known to contain a primary frequency and are rich in multiple harmonics. The application of one or more frequencies, either gently or more vigorously, will all contribute to the pixilation control by a user thereby providing greater flexibility in the cooking programs.

As suggested, a PID controller 92 with simple feedback mechanisms can be used. However, it is also contemplated that a smart phone or other mobile device can be used to run one or multiple programs to control the PID for personalized cooking of meat or other food products to be grilled.

A feature of the invention is providing a "temperature cruise control" mode i.e. to maintain the temperature at a constant user selected temperature. This can be done by utilizing feedback from sensors. The proportional-integral-derivative controller (PID) 92 can be used for this purpose.

The PID controller 92 can also be used for controlling other described functions. Any suitable PID controller can be used. One example of such a controller is Model GL101B Intelligent Temperature Controller marketed by Golander USA (http://www.golanderusa.com) that provides precise control and an auto-tune function that can automatically find the best PID parameters and supports ten different types of commonly used temperature sensor inputs. A general discussion of PID controllers is available at https://wikipedia.org/wiki/PID controller and detailed instructions for the GL101B are available in the User's Guide downloadable at the aforementioned Golander USA website.

Figure 15:
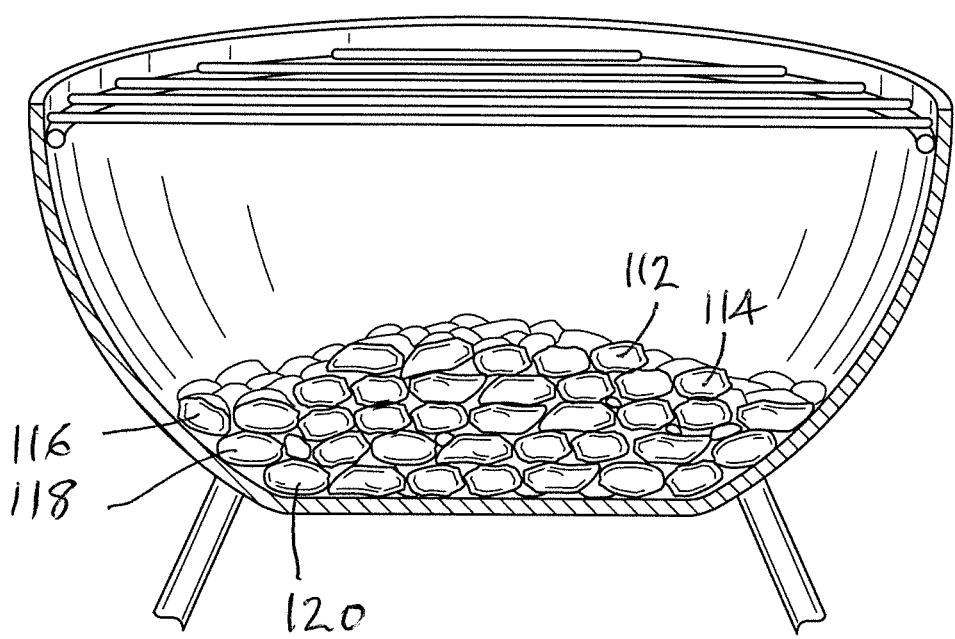
FIG. 15 is a cross-section of the BBQ pan showing multiple layers of charcoal briquettes stacked directly on top of each other.

The prototype has an ignition function that is used to reduce the time it takes to ignite all the charcoal. By using vibration frequencies that maximize removal of ash from the briquettes that have already been ignited the increased heat promotes the more rapid ignition of remaining yet un-ignited briquettes without the use of a "charcoal chimney". When this ignition function or feature is used alone it has been found that the time required to ignite all the briquettes is approximately ⅓ the time it normally takes to ignite all the briquettes on a conventional grill. A charcoal chimney 110 can also be used to ignite either lump charcoal or charcoal briquettes and is typically in the form of a steel cylinder with holes around its circumference below a grate as shown in FIG. 15. Such a chimney promotes air to flow up underneath the charcoal briquettes that rest on top of the grate. When some charcoal is ignited and the fare rises through the grate it ignites the remaining charcoal. When a charcoal chimney is used to enhance air flow together with the subject device the ignition time for igniting all the briquettes can be still further reduced.

Figure 16:
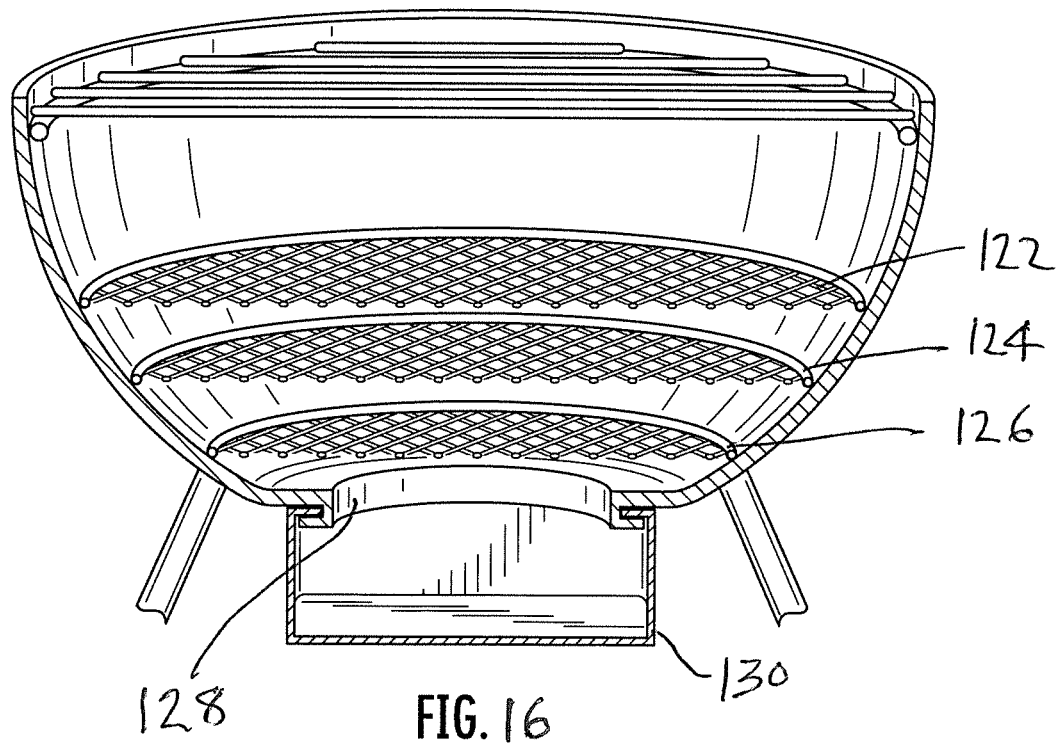
FIG. 16 is similar to FIG. 15 but showing vertically spaced grates for supporting multiple layers of briquettes.
Figure 17:
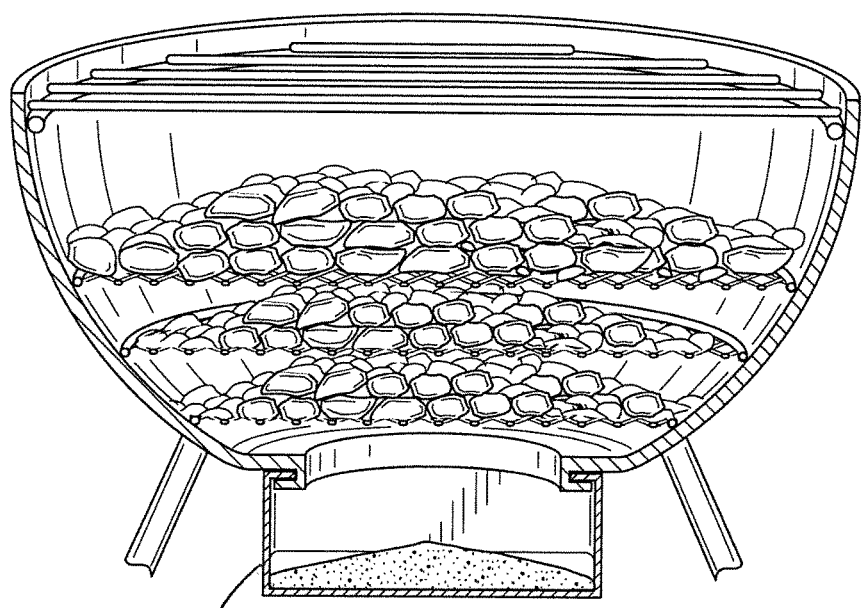
FIG. 17 shows briquettes supported on the grates shown in FIG. 16 and showing a central opening at the bottom of the BBQ pan for allowing ash to fall and/or be steered into a receiving receptacle.
Figure 18:
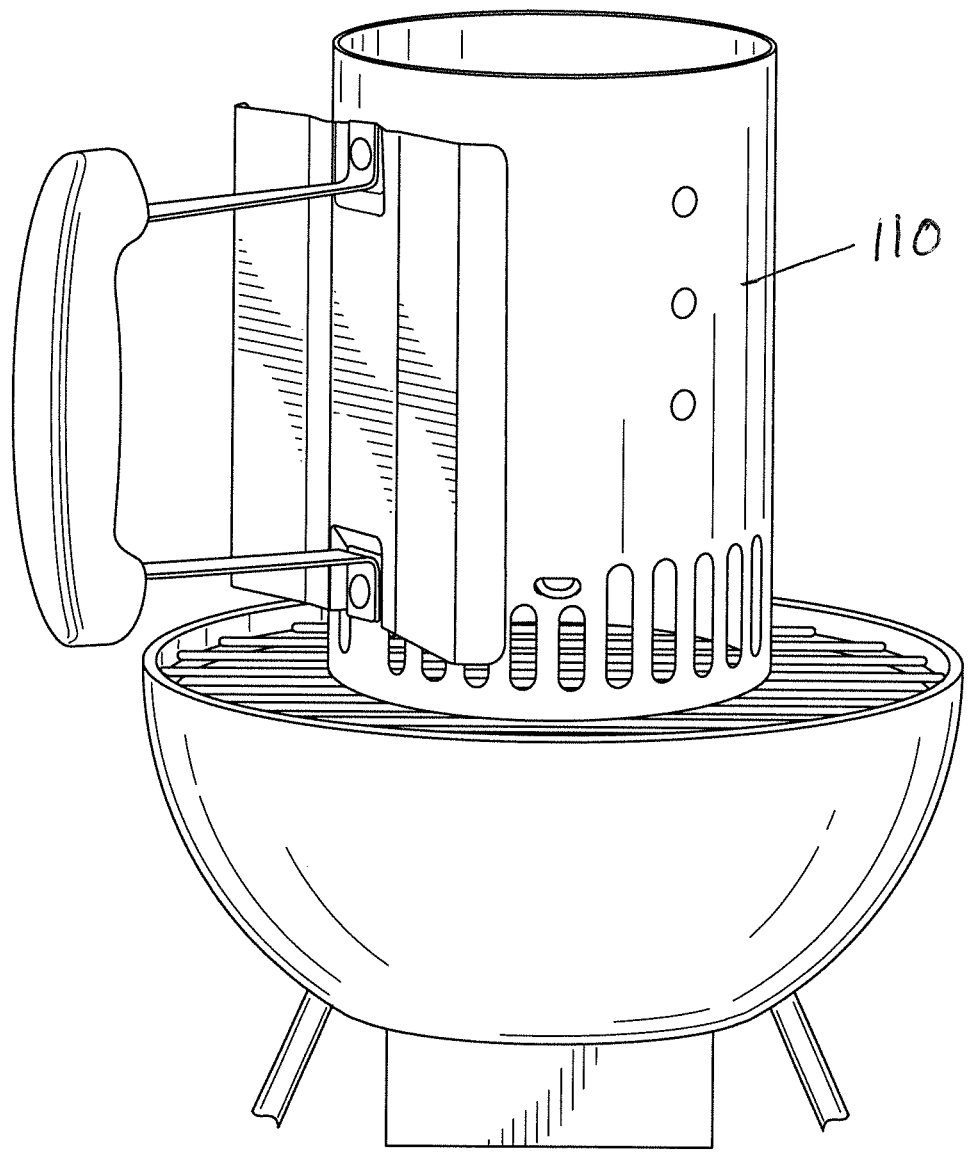
FIG. 18 is a perspective view of a charcoal chimney supported over the BBQ grill pan to accelerate initiation of combustion of the briquettes.
Figure 19:
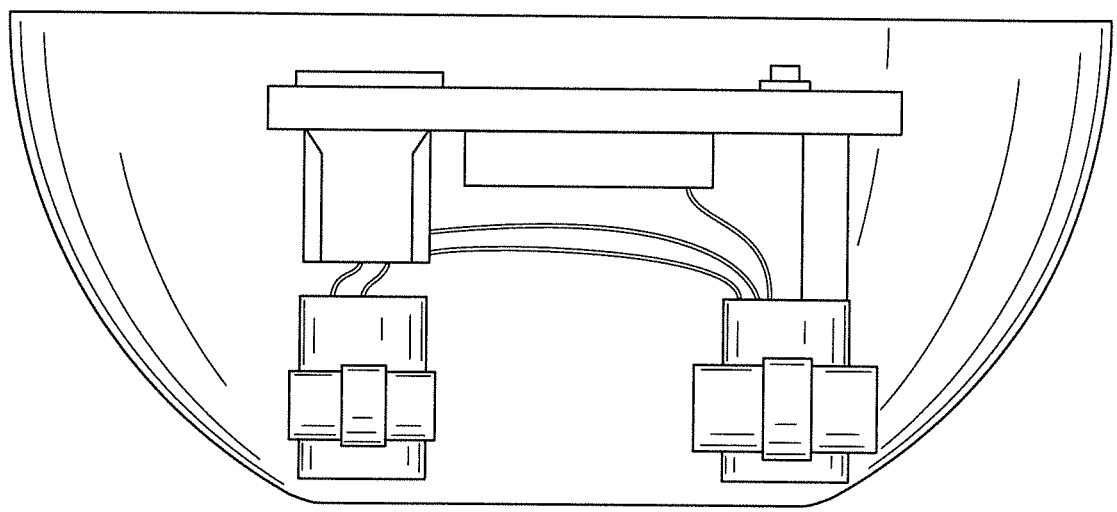
FIG. 19 is a side elevational view of a BBQ pan similar to the one shown in FIG. 12 but with a modified vibration control system utilizing two vibration motors.

Referring to FIGS. 16-18, multiple layers of briquettes 112, 114, 116, 118 and 120 can be directly stacked on top of each other or on vertically spaced grates 122, 124 and 126. The highest level of charcoal will be the only one that will be initially ignited. As this top layer burns, it will prepare the layer of charcoal underneath to get ready to ignite as well by the burning cinders that drop on the lower layer of briquettes. Once the top layer finishes one does not need to manually add charcoal or start the fire from scratch. The next layer will then be ready for use. The charcoal will not be wasted by the fact that any burning charcoal that is left at the end of the barbeque can be starved of oxygen by placing the barbeque grill lid on and closing the bottom vent 128. The unused "fuel" (charcoal) will be left on the grate). The next time that the user uses the grill the user can fill in any open areas on the grate where charcoal is needed.

Once the cooking/grilling is done and the charcoals have turned to ash the vibration technology can also be used to flush the ash out of the grill. This can be done by vibrating the barbeque grill at the greatest vibration level and all the ash is directed down to the collection tray or receptacle 130 without the user needing to touch the grill or the ash. The ash can be flushed out in a matter of seconds. This is crucial as the only other way is to empty out the ashes to flush the grill and get ash everywhere using a scooper, or an ash vacuum. All these other methods require a user to actually touch the grill/scooper vacuum and that means that the user gets his or her hands dirty. With the invention, simply pushing a button and having a bag in place relative to the grill above the tray one can easily catch all the ash and dispose of it without any of it getting into the air or being inhaled by a user.

Different methods of vibrating can be used for different recipes. For example, fast and vibrant vibrations may be better for certain proteins, whereas slow and light vibrations may be better for other foods. The same vibration technology can also be used for hookah, as hookah smokers have to contend with charcoal ash as well.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A device for controlling the temperatures emitted by individual charcoal briquettes in a BBQ comprising:

a BBQ pan defining a surface area configured to receive and support charcoal briquettes distributed in an array over said surface area with each briquette acting as a unitary pixel of a heat source to generate heat within said pan resulting in a coating of ash on the charcoal briquettes as combustion takes place, the level of heat generated by the briquettes being a function of the extent of coating of ash on the charcoal briquettes;

vibrating means for vibrating said pan and the charcoal briquettes supported thereon at least one frequency to set up modal lines or vibration modes corresponding to Chladni vibration patterns over said surface area setting up regions of vibratory movements over some regions of said surface area and setting up substantially stationary regions over other regions of said surface area;

support means for supporting said vibrating means at least one of on and in close proximity of said pan; and A controller configured to selectively activate and deactivate said vibrating means to selectively impart vibrations to said BBQ pan and said charcoal briquettes and selectively remove ash from briquettes supported on said regions of vibratory movements while minimally removing ash from briquettes supported on said stationary regions to control the level of heat emitted by each charcoal briquette pixel as a function of the location of each pixel on said BBQ pan relative to the established nodal lines or vibration modes to provide a desired distribution of heat sources generated by said pixel heat sources over said surface area.

2. The device as defined in claim 1, wherein said controller includes temperature responsive means for generating a signal when the temperature of the briquettes decreases below a desired temperature, said control means being arranged to activate said vibrating means only upon detection of said signal.

3. The device as defined in claim 2, wherein said temperature responsive means includes a thermocouple responsive to the temperature of the briquettes.

4. The device as defined in claim 2, wherein said temperature responsive means includes a wireless external controller.

5. The device as defined in claim 2, wherein said temperature responsive means includes an optical sensor responsive to the temperature of the briquettes.

6. The device as defined in claim 2, wherein said temperature responsive means includes an optical sensor responsive to at least one of the color and image of the briquettes.

7. The device as defined in claim 2, wherein said temperature responsive means includes a timer.

8. The device as defined in claim 1, wherein said pan has a resonant frequency and said vibrating means is arranged to vibrate said pan at its resonant frequency to optimize vibrations of said pan and the briquettes to boost the removal of ash coating or covering on the briquettes and the temperature emitted by the briquettes.

9. The device as defined in claim 1, wherein said control means is programmed to vibrate said pan for a first interval of time followed by a second interval of time during which vibrations are interrupted.

10. The device as defined in claim 1, wherein said controller is configured to maintain the temperature of the briquettes at a desired temperature.

11. The device as defined in claim 10, wherein said control means includes a proportional-integral-derivative (PID) controller.

12. The device as defined in claim 1, wherein said vibrating means includes a vibrator for applying vibrations to said BBQ pan at a single frequency.

13. The device as defined in claim 1, wherein said vibrating means includes a plurality of vibrators for applying vibrations to said BBQ pan at multiple frequencies.

14. The A device as defined in claim 1, wherein said control means comprises a mobile device and an app on said mobile device.

15. The device as defined in claim 1, wherein said controller is configured to vibrate said vibrating means to remove ash from consumed briquettes from said pan.

16. The device as defined in claim 1, wherein said BBQ comprises a plurality of grates arranged in spaced relation in substantially parallel planes above said BBQ pan.

17. The device as defined in claim 1, further comprising means for accelerating ignition and/or combustion of the briquettes.

18. The device as defined in claim 17, wherein said accelerating means comprises a charcoal chimney.

19. The device as defined in claim 1, wherein said vibrating means includes means for adjusting the magnitude of vibrations applied to said BBQ pan at each of said at least one frequency.

* * * * *